(12) United States Patent
Kurisu et al.

(10) Patent No.: US 10,176,252 B2
(45) Date of Patent: Jan. 8, 2019

(54) INFORMATION-PROCESSING DEVICE, SERVER DEVICE, INTERACTION SYSTEM, AND PROGRAM

(71) Applicant: NTT DOCOMO, INC., Tokyo (JP)

(72) Inventors: Toshiharu Kurisu, Tokyo (JP); Yuki Tsuge, Tokyo (JP); Naoki Hashida, Tokyo (JP); Kyoko Masuda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 360 days.

(21) Appl. No.: 14/648,323

(22) PCT Filed: Sep. 20, 2013

(86) PCT No.: PCT/JP2013/075484
§ 371 (c)(1),
(2) Date: May 29, 2015

(87) PCT Pub. No.: WO2014/087714
PCT Pub. Date: Jun. 12, 2014

(65) Prior Publication Data
US 2015/0324458 A1     Nov. 12, 2015

(30) Foreign Application Priority Data
Dec. 4, 2012   (JP) .................................. 2012-265043

(51) Int. Cl.
*G06F 17/30* (2006.01)
*G06F 3/01* (2006.01)
(Continued)

(52) U.S. Cl.
CPC ........ *G06F 17/30696* (2013.01); *G06F 3/011* (2013.01); *G06F 3/048* (2013.01);
(Continued)

(58) Field of Classification Search
CPC ......... G06F 17/30864; G06F 17/30867; G06F 17/30991
(Continued)

(56) References Cited

U.S. PATENT DOCUMENTS 6,069,622 A * 5/2000 Kurlander ............... G06T 11/60
715/753
6,829,606 B2  12/2004 Ripley
(Continued)

FOREIGN PATENT DOCUMENTS

JP    2001249949 A    9/2001
JP    2002024285 A    1/2002
(Continued)

OTHER PUBLICATIONS

Office Action issued in corresponding European Patent Application No. 13860597.7 dated May 19, 2017, pp. 1-9.
(Continued)

*Primary Examiner* — Jeff A Burke
*Assistant Examiner* — Thong H Vu
(74) *Attorney, Agent, or Firm* — MKG, LLC (57) ABSTRACT

Identifying unit identifies a character selected by a user from among plural characters in a terminal, through communication with the terminal via communication unit. Comparison unit, when a first character is identified by identifying unit, compares a history of selections of the first character and a history of selections of a second character with reference to history database. Output unit outputs expression data based on a result of the comparison by comparison unit with reference to expression database, which data represents an expression used when the first character interacts with the user.

17 Claims, 5 Drawing Sheets

(51) Int. Cl.
*G06F 3/0484* (2013.01)
*G06F 3/048* (2013.01)

(52) U.S. Cl.
CPC ...... *G06F 3/0484* (2013.01); *G06F 17/30687* (2013.01); *G06F 17/30693* (2013.01); *G06F 2203/011* (2013.01)

(58) Field of Classification Search
USPC .................. 707/722; 715/752; 705/5; 463/42
See application file for complete search history.

(56) References Cited

U.S. PATENT DOCUMENTS

| | | | |
|---|---|---|---|
| 6,931,656 B1* | 8/2005 | Eshelman | H04N 5/44513 345/473 |
| 6,972,765 B1* | 12/2005 | Duplat | G06T 13/20 345/473 |
| 7,676,369 B2* | 3/2010 | Fujimoto | G10L 15/22 704/231 |
| 7,970,663 B2* | 6/2011 | Ganz | A63F 13/12 463/7 |
| 9,386,094 B2* | 7/2016 | Wood | G06Q 30/02 |
| 9,536,049 B2* | 1/2017 | Brown | G10L 15/08 |
| 9,886,734 B2* | 2/2018 | Chen | G06T 1/20 |
| 9,934,610 B2* | 4/2018 | Gomba | G06T 19/00 |
| 2003/0220796 A1 | 11/2003 | Aoyama et al. | |
| 2005/0033777 A1* | 2/2005 | Moraes | G06F 17/30575 |
| 2005/0120011 A1* | 6/2005 | Dehlinger | G06F 17/2705 |
| 2007/0011140 A1* | 1/2007 | King | H04N 1/00244 |
| 2007/0168237 A1* | 7/2007 | Campbell | G06Q 10/02 705/5 |
| 2007/0213872 A1 | 9/2007 | Matsuzaki et al. | |
| 2007/0261109 A1* | 11/2007 | Renaud | G06F 21/31 726/6 |
| 2008/0133488 A1* | 6/2008 | Bandaru | G06F 17/30864 |
| 2009/0119588 A1* | 5/2009 | Moore | G06Q 10/109 715/706 |
| 2010/0211371 A1* | 8/2010 | Kim | G06F 19/709 703/11 |
| 2011/0022940 A1* | 1/2011 | King | G06F 17/30011 715/229 |
| 2011/0298827 A1* | 12/2011 | Perez | G06K 9/00355 345/647 |
| 2012/0323590 A1* | 12/2012 | Udani | G06Q 10/103 705/2 |
| 2014/0020026 A1* | 1/2014 | Dagaeff | H04N 21/23109 725/46 |
| 2014/0074828 A1* | 3/2014 | Mathur | G06F 17/30035 707/723 |
| 2014/0157149 A1* | 6/2014 | Nishizawa | H04N 21/4788 715/752 |
| 2014/0205195 A1* | 7/2014 | Schonfeld | G06K 9/00523 382/209 |
| 2014/0244619 A1* | 8/2014 | Doroshenko | G06F 17/30126 707/722 |
| 2015/0186156 A1* | 7/2015 | Brown | G06F 3/04817 715/706 |

FOREIGN PATENT DOCUMENTS

| | | |
|---|---|---|
| JP | 2004310034 A | 11/2004 |
| JP | 2005293193 A1 | 10/2005 |
| JP | 2006189394 A | 7/2006 |
| JP | 2007133728 A | 5/2007 |
| JP | 2007241535 A | 9/2007 |
| JP | 2007334685 A1 | 12/2007 |
| JP | 2012094004 A | 5/2012 |
| WO | 2005099971 A1 | 10/2005 |

OTHER PUBLICATIONS

Extended European Search Report issued in corresponding European Application No. 13860597.7 dated Aug. 3, 2016, pp. 1-10.
International Search Report for Corresponding PCT Application No. PCT/JP2013/075484, dated Dec. 10, 2013.
Japanese Office Action issued in corresponding JP Application No. 2014-550951, dated Aug. 11, 2015, pp. 1-2.
Summons to Attend Oral Proceedings issued by the European Patent Office for corresponding European Patent Application No. 13860597.7 dated Dec. 20, 2017, pp. 1-10.

* cited by examiner

| SELECTION DATE | CHARACTER NAME |
|---|---|
| 2012/11/11 11:11:11 | C O 2 |
| 2012/11/10 22:22:22 | C O 2 |
| 2012/11/09 09:09:09 | C O 3 |
| 2012/11/09 02:02:02 | C O 1 |
| ⋮ | ⋮ |

INFORMATION-PROCESSING DEVICE, SERVER DEVICE, INTERACTION SYSTEM, AND PROGRAM

TECHNICAL FIELD

The present invention relates to a user-character interaction function.

BACKGROUND ART

JP 2006-189394 A1 discloses an agent device for a vehicle, which displays an image of an agent that communicates with a vehicle occupant. In the device, it is determined whether a vehicle occupant is talking to the agent image, based on detection results of a visual line detection unit that detects a direction of the occupant's face or a visual line of the vehicle occupant and a speech recognition unit that detects speech of the vehicle occupant.

JP 2004-310034 A1 discloses an interactive agent system, which determines whether a speaker is in a particular emotional condition (for example, feeling impatient) by monitoring a change in position of pupils shown in an image of his/her face captured by a camera.

JP 2002-24285 A1 discloses a user support device, in which an individual user agent is embedded. The individual user agent has a function of acquiring personal data from a user, which function is activated according to a frequency of use of the agent by the user.

JP 2007-133728 A1 discloses an agent device including an agent means with an attitude judging means. The attitude judging means judges that a user is less cooperative if the user does not respond to a question for attitude judgment.

JP 2001-249949 A1 discloses a feeling generating method for generating a feeling of an agent toward an item proposed by a computer, according to a popularity rank of the item.

However, the techniques described in JP2006-189394A1 and JP2004-310034A1 merely identify a user's attitude or feeling toward an agent by detecting a visual line of a vehicle occupant or monitoring a change of position of the pupils of a speaker. The technique described in JP2002-24285A1 merely determines whether to activate a function according to a frequency of use of an agent. The technique described in JP2007-133728A1 merely determines whether a user has a predominant attitude by counting the number of instructions provided by the user. The technique described in JP2001-249949A1 merely changes an attitude of an agent representing its confidence, according to a tallied ranking of agent's proposals. In the techniques described in the foregoing documents, an interactive character does not make a response based on a fact that it has been selected from among plural characters, or does not make a response that makes a user aware of a relative ranking of the character.

An object of the present invention is to enable a character selected by a user from among plural characters to interact with the user based on comparison between the character and another character.

SUMMARY

To solve the problem described above, an information-processing device according to the present invention includes: an identifying unit that identifies a character selected by a user from among plural characters; a comparison unit that in response to identifying of a first character by the identifying unit, compares a history of use of the first character by the user and a history of use of a second character by the user; and an output unit that based on a result of the comparison by the comparison unit, outputs expression data representing an expression used when the first character interacts with the user.

Preferably, the information-processing device may further include an interpretation unit that interprets comments of the user directed to the first character and comments of the user directed to the second character, and the comparison unit, in response to identifying of the first character by the identifying unit, may weight the history of use of the first character based on the comments of the user directed to the first character interpreted by the interpretation unit, weight the history of use of the second character based on the comments of the user directed to the second character interpreted by the interpretation unit, and compare the weighted histories of use.

Preferably, the comparison unit may compare a number of selections of the first character by the user and a number of selections of the second character by the user.

Preferably, the comparison unit may compare a last time when the first character was selected by the user and a last time when the second character was selected by the user.

Preferably, the information-processing device may further include: an execution unit that executes an application; and a detection unit that detects an instruction made by the user to cause the execution unit to execute the application, the instruction being made not via comments directed to the first character, wherein the output unit, in response to the detection of the instruction by the detection unit, outputs expression data representing an expression prompting the user to make the instruction through an interaction with the first character, and in response to an interpretation by the interpretation unit that comments directed to the first character is an instruction for executing the application, outputs a signal to cause the execution unit to execute the application.

Preferably, the comparison unit may compare an amount of conversation that took place between the first character and the user and an amount of conversation that took place between the second character and the user.

Preferably, the information-processing device may further include an execution control unit that based on a result of the comparison by the comparison unit, enables or prohibits an instruction to execute an application using an interaction with the first character.

A server device according to the present invention includes: a communication unit that communicates with a terminal that provides a function for enabling an interaction between a user and a character; an identifying unit that identifies a character selected by the user from among plural characters in the terminal; a comparison unit that in response to identifying of a first character by the identifying unit, compares a history of use of the first character by the user and a history of use of a second character by the user; and an output unit that based on a result of the comparison by the comparison unit, outputs expression data representing an expression used when the first character interacts with the user in the terminal, the communication unit sending the expression data output by the output unit to the terminal.

An interaction system according to the present invention includes: a terminal that provides a function for enabling an interaction between a user and a character; and a server device that communicates with the terminal, the server comprising: a communication unit that communicates with the terminal; an identifying unit that identifies a character selected by the user from among plural characters in the terminal; a comparison unit that in response to identifying of a first character by the identifying unit, compares a history of use of the first character by the user and a history of use of a second character by the user; and an output unit that based on a result of the comparison by the comparison unit, outputs expression data representing an expression used when the first character interacts with the user in the terminal, the terminal comprising: a communication unit that communicates with the server device; an accepting unit that accepts an input operation made by the user to select one from among plural characters; and an interaction unit that causes the first character to interact with the user according to the expression data output by the output unit of the server device.

A program according to the present invention causes a computer to execute the steps of: identifying a character selected by a user from among plural characters; in response to identifying of a first character by the identifying step, comparing a history of use of the first character by the user and a history of use of a second character by the user; and based on a result of the comparison by the comparison step, outputting expression data representing an expression used when the first character interacts with the user.

The present invention enables a character selected by a user from among plural characters to interact with the user based on comparison between the character and another character.

DETAILED DESCRIPTION

1. Embodiment 1-1. Configuration of Interaction System

Figure 1:
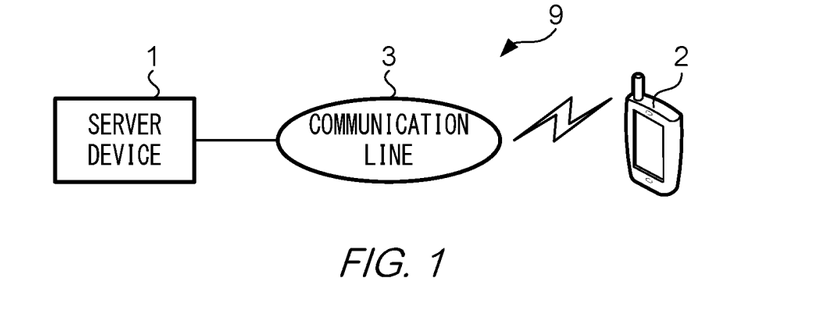
FIG. 1 is a diagram showing an example of a configuration of an interaction system.

FIG. 1 is a diagram showing an example of a configuration of interaction system 9. Interaction system 9 includes server device 1, terminal 2, and communication line 3, which interconnects them. Interaction system 9 may include plural terminals 2.

1-2. Configuration of Server Device

Figure 2:
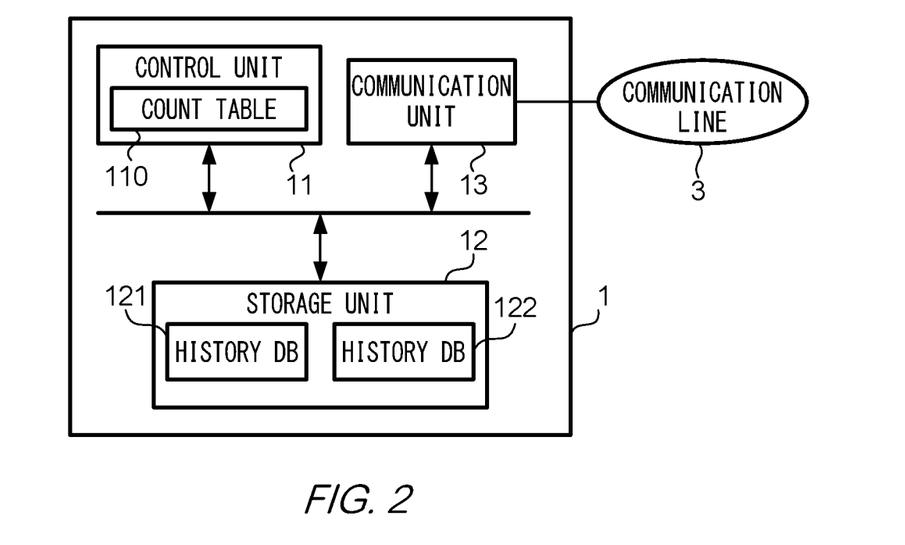
FIG. 2 is a diagram showing a configuration of a server device.

FIG. 2 is a diagram showing a configuration of server device 1. Server device 1 is a device that outputs expression data representing an expression used when a character interacts with a user so that terminal 2 provides a user-character interaction function. A character is a quasi-personality that interacts with a user. Plural characters are provided by server device 1. An interaction realized by a character includes a response or controlling terminal 2, which is performed in response to a user's indication of intention such as a statement or an input operation. A user's statement may be uttered or may be expressed by a character string, which is input using a keyboard, a numerical keypad, or a touch screen.

Server device 1 includes control unit 11, storage unit 12, and communication unit 13. Control unit 11 includes a CPU (Central Processing Unit), a ROM (Read Only Memory), and a RAM (Random Access Memory). The CPU reads and executes a program stored in the ROM or storage unit 12 to control components of server device 1. Control unit 11 counts the number of selections of each character by a user with reference to history database 121 (described later) to prepare count table 110 in the RAM that lists the counted numbers.

Communication unit 13 is an interface that performs communication with terminal 2 via communication line 3 to which server device 1 is connected by cable.

Storage unit 12 is a large-capacity storage device such as an HDD (Hard Disk Drive), which unit stores programs read by the CPU.

Storage unit 12 also stores history database (the term "database" is described as "DB" in the drawings) 121 and expression database 122.

Figure 3:
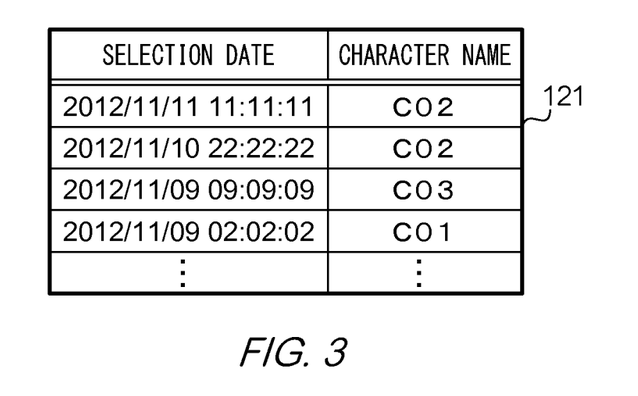
FIG. 3 is a diagram showing an example of a history database.

FIG. 3 is a diagram showing an example of history database 121. History database 121 shown in FIG. 3 stores sets of data on a date and time when a character has been selected by a user from among plural characters, and data on the name (character name) of the selected character. Control unit 11 updates count table 110 each time a character is selected by a user from among plural characters.

Figure 4:
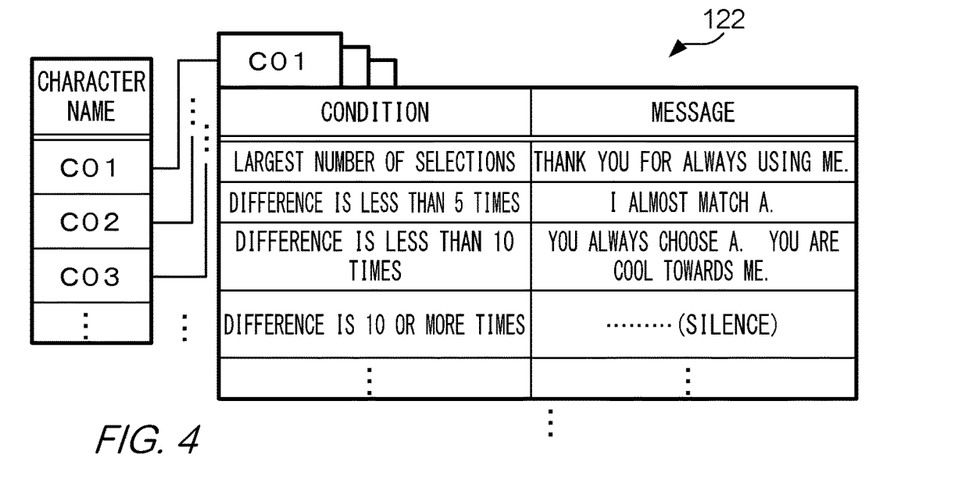
FIG. 4 is a diagram showing an example of an expression database.

FIG. 4 is a diagram showing an example of expression database 122. Expression database 122 shown in FIG. 4 stores sets of data on a character name identifying one from among plural characters, data on conditions on the number of selections of the character identified by the character name, and data on messages, which are expressions used when the character interacts with a user. A determination as to whether a condition described in expression database 122 has been met is made by comparing histories of selections of a selected character and other characters.

As shown in FIG. 4, a condition and a message are associated with each other. When a condition is met, a message corresponding to the condition is used in the interaction. It is to be noted that a relationship between a condition and a message may not be one-on-one. For example, a condition may be associated with messages so that terminal 2 may select and use one of the messages randomly using a pseudo random number.

It is also to be noted that in expression database 122 a condition may be associated with, in addition to a message, other expressions used for interaction with a user such as an image representing an appearance of a character or an animation of an action of the character, which are displayed on screen 251 of terminal 2.

Figure 5:
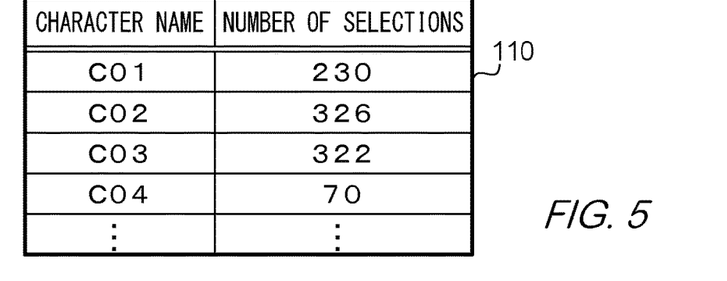
FIG. 5 is a diagram showing an example of a count table.

FIG. 5 is a diagram showing an example of count table 110. In count table 110 shown in FIG. 5, a character name identifying one of a plurality of characters and the number (selection number) of selections of the character are associated with each other. A time period for tallying may be set by a user, which may include a time period between the start time of use of terminal 2, the present time, or an immediate one month period.

1-3. Configuration of Terminal

Figure 6:
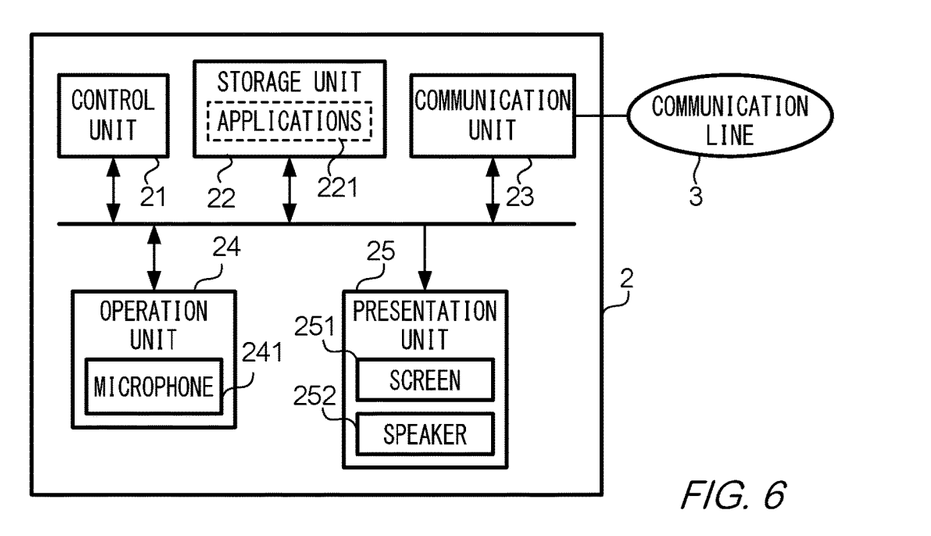
FIG. 6 is a diagram showing an example of a configuration of a terminal.

FIG. 6 is a diagram showing an example of a configuration of terminal 2.

Terminal 2 shown in FIG. 6 includes control unit 21, storage unit 22, communication unit 23, operation unit 24, and presentation unit 25. Control unit 21 includes a CPU, a ROM, and a RAM. The CPU reads and executes a program stored in the ROM or storage unit 22 to control components of terminal 2.

Storage unit 22 is a large-capacity storage device such as an SSD (Solid State Drive), which unit stores programs read by the CPU.

Communication unit 23 is an interface that makes a wired or wireless connection to communication line 3 to communicate with server device 1 via communication line 3. Terminal 2 shown in FIG. 1 is, for example, a mobile communication terminal such as a mobile phone. The mobile communication terminal makes a wireless connection to communication line 3.

Operation unit 24 includes a coordinates acquiring unit or operation keys for inputting instructions so that operation unit 24 may accept an input operation performed by a user, and provide control unit 21 with a signal indicative of the input operation. Operation unit 24 also includes microphone 241 for detecting a speech uttered by a user, and generating a signal according to the speech. Operation unit 24 serves as an accepting unit that accepts a user's input operation to select one from among plural characters.

Presentation unit 25 includes screen 251 such as a liquid crystal screen so that presentation unit 25 may display an image on screen 251 under control of control unit 21. For example, when control unit 21 receives expression data output by server device 1 via communication unit 23, control unit 21 causes screen 251 to display a character string of a message represented by the expression data, which character string is displayed within a balloon drawn above a character.

Presentation unit 25 also includes speaker 252 for converting a speech signal into speech and outputting it as audio so that presentation unit 25 may cause speaker 252 to output speech under control of control unit 21. For example, when control unit 21 receives expression data output by server device 1 via communication unit 23, control unit 21 converts a message represented by the expression data into speech, using voice quality data pre-assigned to a selected character, and causes speaker 252 to output the speech.

Presentation unit 25 serves as an interaction unit that causes a character to interact with a user according to expression data output by output unit 113 (described later) of server device 1.

1-4. Functional Configuration of Server Device

Figure 7:
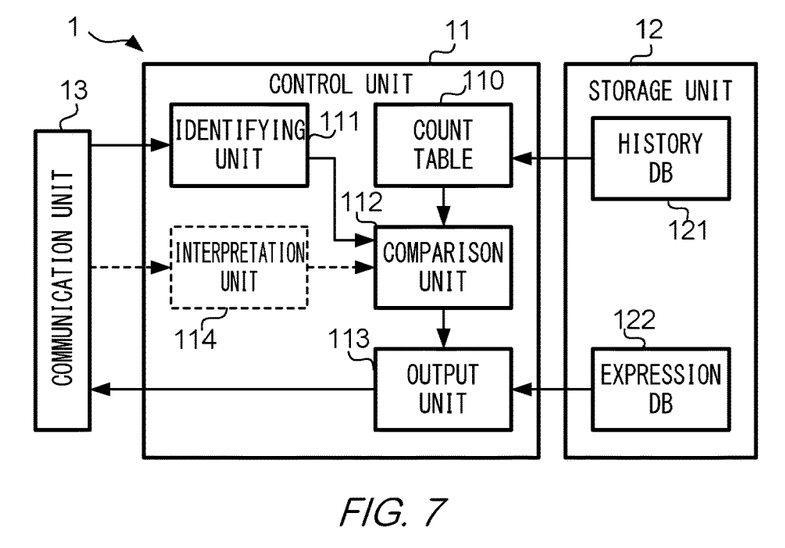
FIG. 7 is a diagram showing a functional configuration of the server device.

FIG. 7 is a diagram showing a functional configuration of server device 1. Control unit 11 of server device 1 functions as identifying unit 111, comparison unit 112, and output unit 113, by executing the program described above.

Terminal 2, when a user selects a character as an interaction partner, sends a signal indicative of the selected character to server device 1 via communication line 3. Identifying unit 111 receives the signal via communication unit 13, and identifies, based on the signal, a character selected by the user from among plural characters in terminal 2.

Comparison unit 112, when a character (hereinafter referred to as "first character") is identified by identifying unit 111, refers to history database 121 stored in storage unit 12 to compare a history of use of the first character by the user and a history of use of a second character other than the first character. Specifically, comparison unit 112 prepares count table 110 in the RAM of control unit 11 based on history database 121, and when notified of a selected character by identifying unit 111, compares the number of selections of the selected character, which is the first character, and the number of selections of a character other than the first character, which is a second character.

Second characters may be all selectable characters other than a first character. Alternatively, a second character may be the most or least frequently selected character in a ranking in which all selectable characters are arranged in order of the number of selections. Alternatively, a second character may be a character immediately above or below a first character in the ranking.

Output unit 113 refers to expression database 122 of storage unit 12 to output expression data representing an expression used when a first character interacts with a user, based on a result of comparison by comparison unit 112. The output expression data is sent to terminal 2 via communication unit 13 upon request from terminal 2 or under control of control unit 11. Control unit 21 of terminal 2 that has acquired the expression data, outputs a first character giving a message to a user and behaving in accordance with the expression data.

1-5. Operation of Server Device

Figure 8:
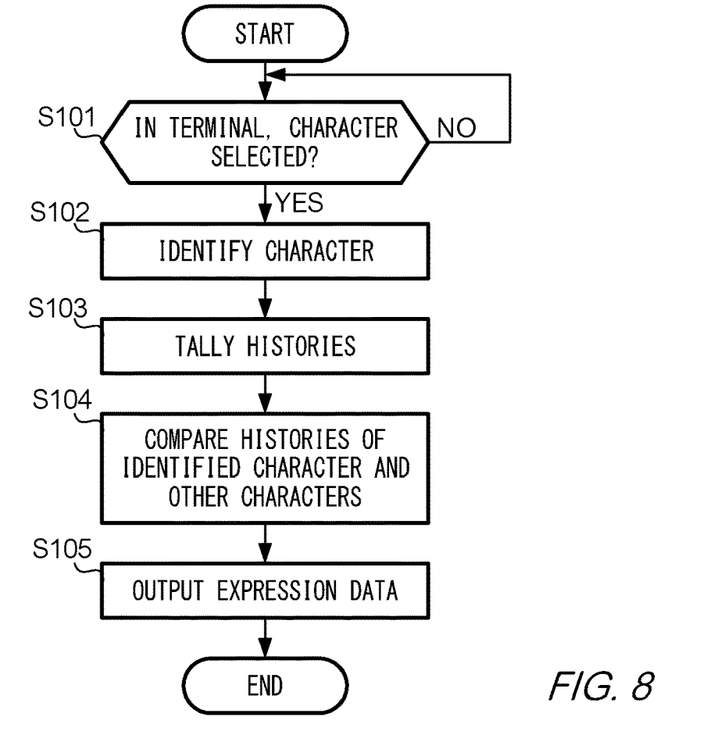
FIG. 8 is a flowchart showing a flow of an operation performed by the server device in the interactive system.

FIG. 8 is a flowchart showing a flow of an operation performed by server device 1 in interaction system 9. Control unit 11 of server device 1 initially determines whether a character has been selected in terminal 2 (step S101). While a determination is made that a character has not been selected (step S101; NO), control unit 11 repeats the determination processing. On the other hand, when determining that a character has been selected (step S101; YES), control unit 11 identifies the character selected in terminal 2 (step S102). Control unit 11 also counts, as history data for each of the characters, the number of selections of each character with reference to history database 121 (step S103). Count table 110 is prepared in the RAM of control unit 11.

Control unit 11 compares the number of selections (history) of the character identified at step S102 (namely, a first character) and the number of selections (history) of another character (namely, a second character(s)) (step S104). Subsequently, control unit 11 retrieves expression data from expression database 122 based on the result of the comparison, and outputs the expression data (step S105).

Figure 9:
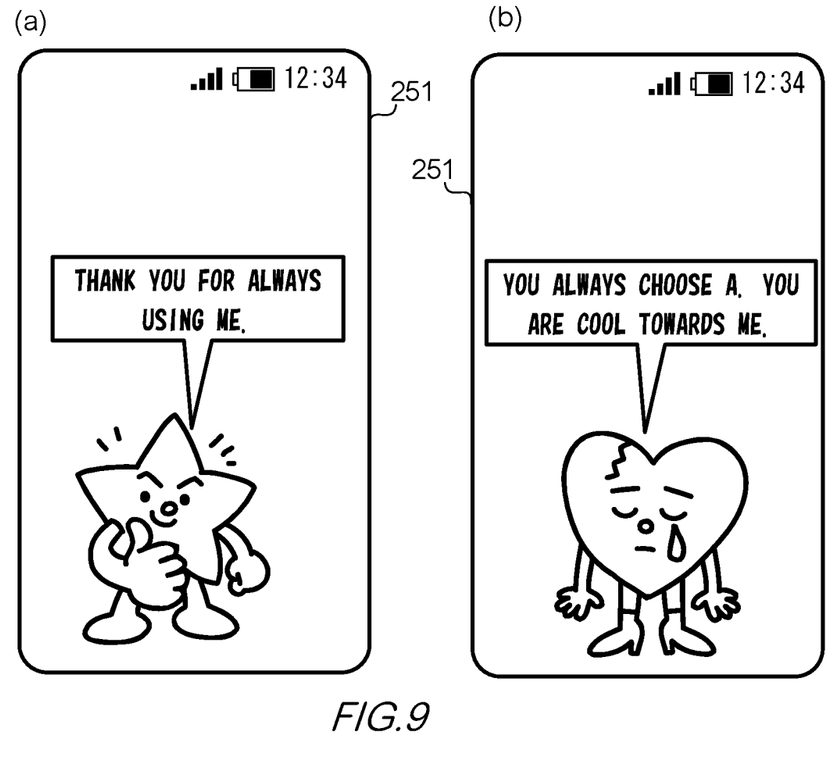
FIG. 9 is a diagram showing examples of a character displayed on a screen of the terminal.

FIG. 9 is a diagram showing examples of a character displayed on screen 251 of terminal 2. A character shown in FIG. 9(*a*) is an example of a character that meets a condition "Largest Number of Selections" (see FIG. 4), which means that the character is the most selected character among all the characters stored in storage unit 12 of server device 1. In a case where the character is displayed, server device 1 outputs expression data representing a message "Thank you for always using me," which is associated with the condition "Largest Number of Selections" in expression database 122 shown in FIG. 4, and sends the expression data to terminal 2. As a result, the image shown in FIG. 9(a) is displayed on screen 251 of terminal 2.

On the other hand, a character shown in FIG. 9(b) is an example of a character, the number of selections of which differs from that of the most selected character by 5 or more but less than 10. In other words, the character meets a condition "Difference is Less Than 10 Times" (see FIG. 4). In a case where the character is displayed, server device 1 outputs expression data representing a message "You always choose A. You are cool towards me," which is associated with the condition "Difference is Less Than 10 Times," and sends the expression data to terminal 2. As a result, the image shown in FIG. 9(b) is displayed on screen 251 of terminal 2. It is to be noted that the term "A" included in the message is replaced by control unit 11 with the character name of the most selected character that appears in count table 110 shown in FIG. 5.

According to the foregoing operation, in interaction system 9 according to the present invention, a message given by a character selected by a user from among plural characters changes according to a result of a comparison between the number of selections of the selected character and the number of selections of another character. Accordingly, the user is able to feel that the selected character is aware of the existence of another character, through an interaction with the selected character. In interaction system 9, in a case where expression database 122 is built in such a way that as the number of selections increases, a degree of friendliness of an expression increases, whereby a user may be motivated to select a single character. In another case where expression database 122 is built in such a way that a character expresses its feeling in an interaction based on a comparison with another character, a user may be motivated intentionally not to select a certain character for a while, and thereafter to select it.

2. Modifications

The above embodiment may be modified as described below. The following modifications may be combined with each other.

2-1. Modification 1

In the above embodiment, where comparison unit 112 compares the number of selections of a first character and the number of selections of a second character, the numbers of selections may be weighted according to a user's comments. In such a case, control unit 11 serves as interpretation unit 114, which is shown by a dashed line in FIG. 7. Interpretation unit 114 interprets user's comments directed to a selected character based on interaction data sent from terminal 2. Comparison unit 112 weights numbers of selections according to user's comments interpreted by interpretation unit 114.

For example, in a case where interpretation unit 114 has extracted a keyword showing a user's attention to a character such as "thank you" from the user's comments, interpretation unit 114 may instruct comparison unit 112 to adjust the number of selections. In such a case, data on values (hereinafter referred to as "points") indicative of how a user cares about a character may be stored in history database 121 for each interaction. The data may be stored in association with a selection date and time and a character name. For example, in the above case where the keyword has been extracted, interpretation unit 114 may increase points recorded in history database 121. To summarize, control unit 11, when a user's conversation has been interpreted as being attentive to a character, updates history database 121 to increase points recorded therein.

Comparison unit 112 may add up points recorded in history database 121 to prepare count table 110. Specifically, comparison unit 112 may calculate, for each character, a sum of points recorded in history database 121. Subsequently, comparison unit 112 may weight the number of selections based on points recorded in history database 121. Weighting is performed when a predetermined keyword has been extracted by interpretation unit 114 from a user's comments, as described above. Subsequently, comparison unit 112 may compare calculated values between a character selected in terminal 2 and another character. Subsequently, output unit 113 may output expression data representing an expression used when the selected character interacts with a user, based on a result of the comparison by comparison unit 112 and expression database 122 stored in storage unit 12.

According to the foregoing configuration, server device 1 outputs expression data representing an expression used in an interaction, based on both comments of a user of terminal 2 and the number of selections, and provides the expression data to terminal 2. Accordingly, a response by a character to a user's comments reflects how many more times the user has selected the character as compared with other characters and how the user has been attentive to the character. For example, a character that has been selected more frequently than other characters may respond to the user's comments while expressing a feeling of gratitude. A character that has not frequently been selected may respond to the user's comments while expressing a feeling of dissatisfaction or sadness. A character that is seldom selected may name a character that has been frequently selected, and express a feeling of envy. In this manner, interaction system 9 makes a user feel as if a selected character feels some rivalry with another character.

2-2. Modification 2

In the above embodiment, comparison unit 112 compares the number of selections of a first character and the number of selections of a second character. However, histories to be compared are not limited to the numbers of selections. For example, comparison unit 112 may compare a last time when a first character was selected by a user and a last time when a second character was selected by the user. In such a case, expression database 122 may store sets of data on a condition on a last time when a character was selected and data on an expression used when the character interacts with a user. Control unit 11 may extract the time when a character was last selected (i.e. last time), from history database 121 to prepare count table 110. In count table 110, a character name of each character is associated with a last time (time and date) that the character was selected by a user. According to the foregoing configuration, a character that has not been selected by a user for a longer period of time than other characters may interact with the user while naming a character that was selected in the meantime. In this manner, interaction system 9 makes a user feel as if a selected character feels some rivalry with another character.

2-3. Modification 3

Comparison unit 112 may alternatively compare amounts of conversation such as the number of user's comments or total hours of conversation, between characters. In such a case, data on an amount of conversation may be stored in history database 121 in association with a selection date and time and a character name. Expression database 122 may store sets of data on a condition on an amount of conversation between a user and a character, and data on an expression used when the character interacts with the user. Control unit 11 may calculate an amount of conversation between a user and a character based on history database 121 to prepare count table 110, which associates, for each character, a character name and an amount of conversation such as the number of comments made by a user to the character or total hours of conversation with a user. According to the foregoing configuration, a message given by a character may change according to an amount of conversation between the character and a user even if the number of selections is the same. A character with a smaller amount of conversation may name a character with a larger amount of conversation, and make an appeal to a user for a larger amount of conversation with the character. In this manner, interaction system 9 makes a user feel as if a selected character feels some rivalry with another character.

It is to be noted that the above total number of hours of conversation specifically refers to a sum of a time period when comments are being input via microphone 241 by a user with a character on screen, and a time period when a message of the character is being output from speaker 252. It is also to be noted that the above amount of conversation may include an amount of user's comments (specifically, the number of characters constituting comments input by a user using operation unit 24).

2-4. Modification 4

In the above embodiment, control unit 11, when a first character has been selected, compares a history of selections of the first character and a history of selections of a second character, and outputs expression data representing an expression used when the first character interacts with the user, based on a result of the comparison. In addition, control unit 11, in a case where a user has performed an instruction to execute an application program (hereinafter referred to as "application") not through comments directed to a character, may prompt the user to perform the instruction through an interaction with the character.

Figure 10:
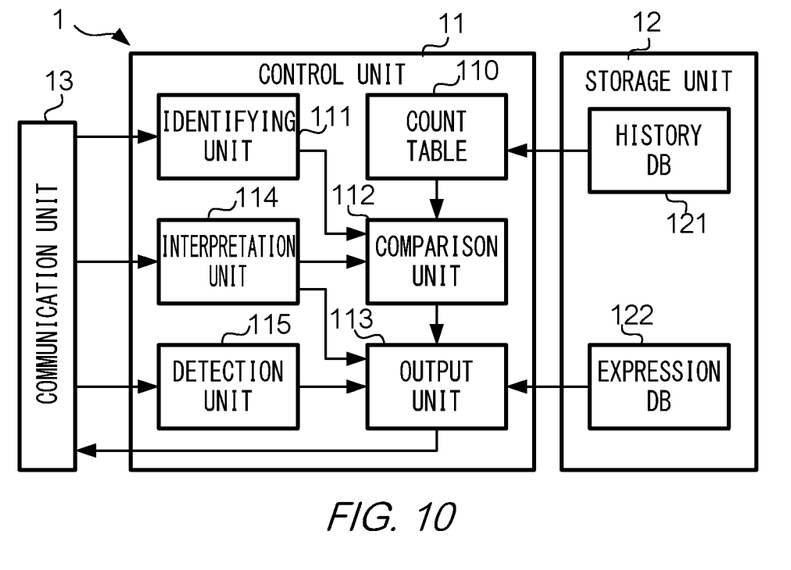
FIG. 10 is a diagram showing a functional configuration of a server device according to a modification.

FIG. 10 is a diagram showing a functional configuration of server device 1 according to the present modification. In the present modification, storage unit 22 of terminal 2 stores applications 221 shown by a dashed line in FIG. 6. Applications 221 are one or more applications to be executed by control unit 21 of terminal 2. Control unit 11 accepts an instruction to execute one of the applications via a user's input operation performed against operation unit 24, which instruction includes an instruction using an interaction with a character and an instruction performed not through comments directed to a character. An instruction using an interaction with a character herein refers to, for example, an instruction to execute an application input by voice (in other words, interpreted through a speech recognition processing). On the other hand, an instruction performed not through comments directed to a character herein refers to, for example, an instruction to execute an application input not by voice. Specifically, the instruction refers to an instruction to execute an application performed by selecting an icon representing the application shown on screen 251 using operation unit 24.

In a case where a "launcher screen" is displayed on screen 251 by a control program executed by control unit 21, where images of applications are shown as icons, if a user touches a certain position on screen 251 over an icon, coordinates of the position are identified by a coordinate acquiring unit of operation unit 24, and notified to control unit 21. Control unit 21 identifies an application based on the coordinates, and executes the application. Namely, control unit 21 serves as an execution unit that executes an application. When having executed an application, control unit 21 informs server device 1 via communication unit 23 that the user has performed an instruction to execute an application not through comments directed to a character.

Control unit 11 of server device 1 is notified that the user has instructed terminal 2 to execute an application not through comments directed to a character. In such a case, control unit 11 serves as detection unit 115 that detects the instruction, which is shown in FIG. 10. When the instruction has been detected by detection unit 115, output unit 113 outputs expression data representing an expression for prompting the user to perform the instruction using an interaction with a first character.

Figure 11:
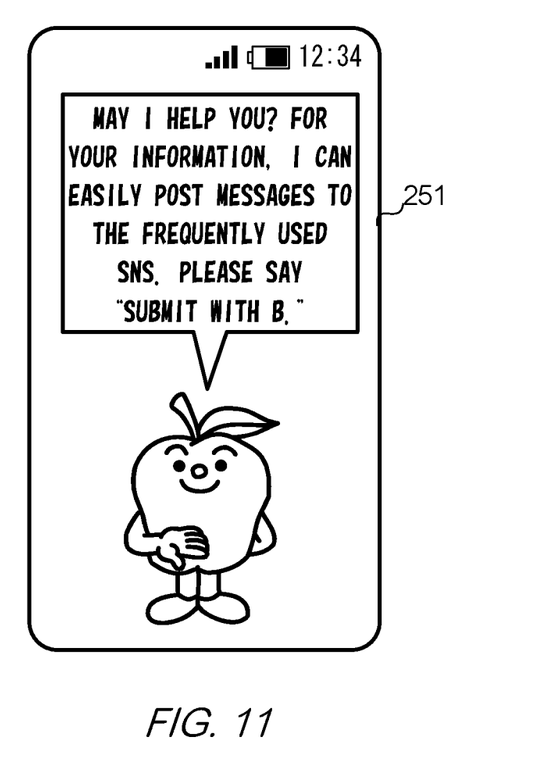
FIG. 11 is a diagram showing an example of a character displayed on a screen of a terminal according to a modification.

FIG. 11 is a diagram showing an example of a character displayed on screen 251 of terminal 2 according to the present modification. It is now assumed that before selecting a character, a user has performed an instruction to execute an application for posting a message to an SNS (Social Networking Service), by touching the above launcher screen.

After performing the instruction, when the user selects a character shown in FIG. 11 to start an interaction with the character, the character provides the user with a message "May I help you? For your information, I can easily post messages to the frequently used SNS. Please say "submit with B."" to prompt the user to perform the instruction by an interaction with the character. Upon seeing the message, the user comes to realize that the instruction can be performed through an interaction with the character.

In a case where comments made by a user have been interpreted by interpretation unit 114 as an instruction to execute an application, output unit 113 outputs a signal whereby control unit 21 (execution unit) of terminal 2 is caused to execute the application, and communication unit 13 sends the signal to terminal 2. Control unit 21 of terminal 2, upon receipt of the signal, executes the indicated application. This is the way in which an instruction to execute an application is performed through an interaction between a user and a character.

2-5. Modification 5

In the above embodiment where output unit 113 outputs expression data representing an expression used when a first character interacts with a user, based on a result of a comparison by comparison unit 112, the expression data may represent an expression relevant to an instruction to execute an application performed by an interaction between a user and a first character. For example, the expression data may represent an expression notifying that an instruction to execute an application through an interaction has been enabled or disabled. Terminal 2, in line with the expression data output by output unit 113, may actually enable or disable a user to perform an instruction to execute an application through an interaction. In such a case, control unit 21 serves as an execution control unit that enables or prohibits an instruction to execute an application using an interaction with a character, based on a result of a comparison by comparison unit 112. The execution control unit specifically enables or prohibits an instruction to execute an application using an interaction with a character, when a result of a comparison by comparison unit 112 satisfies a predetermined condition. An instruction to execute an application using an interaction with a character herein refers to, for example, an instruction to execute an application input by voice (in other words, interpreted through speech recognition processing).

In a case where a character selected by a user satisfies a condition "Largest Number of Selections" shown in FIG. 4, server device 1 may output expression data representing a message "Thank you for always using me. I've become able to invoke this application from today." as a message given by the character, and send the expression data to terminal 2. Terminal 2, upon receipt of the expression data, may display the character together with the message on screen 251. Terminal 2 may also become able to invoke the application mentioned in the message.

In another case where a character selected by a user satisfies a condition "Difference is less than 10 times" shown in FIG. 4, server device 1 may output expression data representing a message "You always choose A. You are cool towards me. I refrain from invoking application C" as a message given by the character, and send the expression data to terminal 2. In such a case, terminal 2 may prohibit a user from invoking application C through an interaction with the character.

In another case where a character selected by a user satisfies a condition "Difference is less than 10 times" shown in FIG. 4, server device 1 may output expression data representing a message "If you use me more times than A, I'll enable invocation of application B, which is not available using A," as a message given by the character, and send the expression data to terminal 2. In such a case, terminal 2 may enable a user to invoke application B through an interaction with the character when the number of selections of the character has exceeded the number of selections of character A.

2-6. Modification 6

The program executed by control unit 11 of server device 1 or control unit 21 of terminal 2 may be stored in a computer-readable recording medium for distribution such as a magnetic recording medium (for example, a magnetic tape or a magnetic disk), an optical recording medium (for example, an optical disk), a magneto-optical recording medium, or a semiconductor memory. The program may also be downloaded through a network such as the Internet. It is to be noted that in the above embodiment, as a control unit such as control unit 11 or control unit 21, a device other than a CPU, such as a dedicated processor, may be used.

2-7. Modification 7

In the above embodiment, terminal 2 may be, instead of a mobile phone, a slate PC (Personal Computer), a tablet PC, a PDA (Personal Digital Assistant), a portable music player, a portable video player, a game machine, an electronic book reader, or a navigation device.

2-8. Modification 8

In the above embodiment, an interaction between a user and a character is enabled by communication between server device 1 and terminal 2 through communication line 3. However, an interaction may be enabled in an information-processing device including functions of both server device 1 and terminal 2.

The functions provided by server device 1 in the above embodiment and modifications may be provided by terminal 2.

What is claimed is:

1. An information-processing device comprising:
   an identifying unit that identifies a fictional character selected by a user from among plural fictional characters to execute an application by use of an interaction between the user and the selected fictional character;
   a comparison unit that in response to identifying of a first character included in the plural fictional characters by the identifying unit, calculates a difference between a number of times the first character has been selected by the user to execute the application and a number of times a second character included in the plural fictional characters has been selected by the user to execute the application, the first character being different from the second character; and
   an execution control unit that performs control associated with the calculated difference in a database, the control enabling the user to execute the application by use of the interaction with the first character, or prohibiting the user from executing the application by use of the interaction with the first character.

2. The information-processing device according to claim 1, further comprising an interpretation unit that interprets comments of the user directed to the first character and comments of the user directed to the second character, wherein the comparison unit, in response to identifying of the first character by the identifying unit, weights a history of use of the first character based on the comments of the user directed to the first character interpreted by the interpretation unit, weights a history of use of the second character based on the comments of the user directed to the second character interpreted by the interpretation unit, and compares the weighted histories of use.

3. The information-processing device according to claim 2, further comprising:
   an execution unit that executes an application; and
   a detection unit that detects an instruction made by the user to cause the execution unit to execute the application, the instruction being made not via comments directed to the first character, wherein the output unit, in response to the detection of the instruction by the detection unit, outputs expression data representing an expression prompting the user to make the instruction through an interaction with the first character, and in response to an interpretation by the interpretation unit that comments directed to the first character is an instruction for executing the application, outputs a signal to cause the execution unit to execute the application.

4. The information-processing device according to claim 1, wherein the comparison unit compares a last time when the first character was selected by the user and a last time when the second character was selected by the user.

5. The information-processing device according to claim 1, wherein the comparison unit compares an amount of conversation that took place between the first character and the user and an amount of conversation that took place between the second character and the user.

6. The information-processing device according to claim 1, further comprising an expression database storing sets of data associated with the plural fictional characters, the data including information identifying each of the plural fictional characters, information on conditions on the selections of the identified fictional characters, and information on the expressions associated with the identified fictional characters.

7. The information-processing device according to claim 1, further comprising a count table storing data associated with the plural fictional characters, the data including information identifying each of the plural fictional characters, and information on a number of selections of the identified fictional character, the number of selections representing the history of use of the identified fictional character.

8. The information-processing device according to claim 7, wherein the count table is arranged in order of the number of selections of the identified fictional characters to establish a ranking of the fictional characters.

9. The information-processing device according to claim 8, wherein the second character is ranked in proximity to the first character in the count table.

10. The information-processing device according to claim 1, wherein the plural fictional characters are interaction partners for the user.

11. The information-processing device according to claim 1, wherein the comparison unit performs at least one of:
adjusting the number of times the first character has been selected based on the user's comments toward the first character; and
adjusting the number of times the second character has been selected based on the user's comments toward the second character.

12. The information-processing device according to claim 11, wherein the comparison unit performs at least one of:
storing a first value in the database that is associated with the first character and is based on the user's comments toward the first character, and weighting the number of times the first character has been selected based on the first value, wherein the first value is increased based on the user's comments interpreted as being attentive to the first character; and
storing a second value in the database that is associated with the second character and is based on the user's comments toward the second character and weighting the number of times the second character has been selected based on the second value, wherein the second value is increased based on the user's comments interpreted as being attentive to the second character.

13. The information-processing device according to claim 1, wherein the information-processing device outputs a message to the user via the selected character of the plural fictional characters, the message reflecting how many more times the selected character has been selected as compared to another character.

14. The information-processing device according to claim 1, wherein the information-processing device outputs expression data representing an expression used when the selected character interacts with the user, and the expression has a degree of friendliness that increases based on an increase in a number of times the selected character has been selected by the user to execute the application.

15. A server device comprising:
a communication unit that communicates with a terminal that provides a function for enabling an interaction between a user and a fictional character;
an identifying unit that identifies the fictional character selected by the user from among plural fictional characters in the terminal to execute an application by use of an interaction between the user and the selected fictional character;
a comparison unit that in response to identifying of a first character included in the plural fictional characters by the identifying unit, calculates a difference between a number of times the first character has been selected by the user to execute the application and a number of times a second character of included in the plural fictional characters has been selected by the user to execute the application, the first character being different from the second character; and
an execution control unit that performs control associated with the calculated difference in a database, the control enabling the user to execute the application by use of an interaction with the first character, or prohibiting the user from executing the application by use of the interaction with the first character.

16. An interaction system comprising:
a terminal that provides a function for enabling an interaction between a user and a fictional character; and
a server device that communicates with the terminal, the server comprising:
a communication unit that communicates with the terminal;
an identifying unit that identifies the fictional character selected by the user from among plural fictional characters in the terminal to execute an application by use of an interaction between the user and the selected fictional character;
a comparison unit that in response to identifying of a first character included in the plural fictional characters by the identifying unit, calculates a difference between a number of times the first character has been selected by the user to execute the application and a number of times a second character included in the plural fictional characters by the user to execute the application, the first character being different from the second character;
an execution control unit that performs control associated with the calculated difference in a database, the control enabling the user to execute the application by use of an interaction with the first character, or prohibiting the user from executing the application by use of the interaction with the first character; and
an output unit that based on a result of the comparison by the comparison unit, outputs expression data representing an expression used when the first character interacts with the user in the terminal, the expression including at least one of a message from, an appearance of, and an animation of an action of the first character, the terminal comprising:
a communication unit that communicates with the server device;
an accepting unit that accepts an input operation made by the user to select one from among the plural fictional characters; and
an interaction unit that causes the first character to interact with the user according to the expression data output by the output unit of the server device.

17. A non-transitory computer readable medium storing a program for causing a computer to execute the steps of:
identifying a fictional character selected by a user from among plural fictional characters to execute an application by use of an interaction between the user and the selected fictional character;
in response to identifying of a first character included in the plural fictional characters by the identifying step, calculating a difference between a number of times the first character has been selected by the user to execute the application and a number of times a second character included in the plural fictional characters by the user to execute the application, the first character being different from the second character;
based on the difference, enabling the user to execute the application by use of an interaction with the first character, or prohibiting the user from executing the application by use of the interaction with the first character; and
based on a result of the comparison by the comparison step, outputting expression data representing an expression used when the first character interacts with the user, the expression including at least one of a message from, an appearance of, and an animation of an action of the first character.

\* \* \* \* \*